(12) United States Patent
Rioux

(10) Patent No.: US 7,490,806 B2
(45) Date of Patent: Feb. 17, 2009

(54) STORAGE RACK COLUMN PROTECTOR

(75) Inventor: Sylvain Rioux, Ste-Julie (CA)

(73) Assignee: Equipement Boni inc., St-Bruno, Quebec (CA)

( * ) Notice: Subject to any disclaimer, the term of this patent is extended or adjusted under 35 U.S.C. 154(b) by 323 days.

(21) Appl. No.: 11/386,731

(22) Filed: Mar. 23, 2006

(65) Prior Publication Data

US 2007/0221596 A1  Sep. 27, 2007

(51) Int. Cl.
*A47B 95/00* (2006.01)
(52) U.S. Cl. .................. 248/345.1; 428/99; 52/170; 52/244; 16/404
(58) Field of Classification Search ............. 248/345.1, 248/548, 615; 211/191; 52/244, 170, 292, 52/297, 736.1; 256/65.14, 1, 19; 16/404
See application file for complete search history.

(56) References Cited

U.S. PATENT DOCUMENTS

| | | | | |
|---|---|---|---|---|
| 2,606,755 | A * | 8/1952 | Samuels | ............... 267/140 |
| 4,113,110 | A | 9/1978 | Mittag | |
| 5,369,925 | A | 12/1994 | Vargo | |
| 5,560,451 | A | 10/1996 | Hincks | |
| 5,622,356 | A | 4/1997 | Duggan | |
| 5,897,465 | A * | 4/1999 | Hautamaki | ............... 482/83 |
| 6,242,070 | B1 | 6/2001 | Gillispie et al. | |
| 6,257,557 | B1 | 7/2001 | Anderson et al. | |
| 6,260,237 | B1 * | 7/2001 | McCue et al. | ............... 16/404 |
| 6,609,620 | B1 | 8/2003 | Kautz et al. | |
| 6,672,017 | B2 | 1/2004 | Larson | |
| 6,739,563 | B1 | 5/2004 | Wallace | |
| 6,920,990 | B2 | 7/2005 | Krueger et al. | |
| 6,929,571 | B2 * | 8/2005 | Jesch et al. | ............... 473/479 |
| 2001/0047975 | A1 | 12/2001 | Lazas et al. | |
| 2005/0087664 | A1 | 4/2005 | Ciarlo | |

OTHER PUBLICATIONS

Image of John Deere 9000T (1 sheet)(1999).
Images of Caterpillar Challenger (2 sheets)(Nov. 8, 2004).
Images of Case IH Quadtrac (2 sheets)(Nov. 8, 2004).

* cited by examiner

*Primary Examiner*—Anita M King
(74) *Attorney, Agent, or Firm*—Equinox Protection; Frank Bonsang, Patent Agent

(57) ABSTRACT

A storage rack column protector includes a base plate securable to the floor and with an upstanding flange at one end thereof, the base plate providing a support surface on which the column sits in use. A buffer housing incorporating a resilient block is disposed on the side of the flange remote from the column, the housing embracing the flange. In the event of impact the buffer housing and the resilient block move to absorb the shock and thus protect the column from damage.

13 Claims, 5 Drawing Sheets

STORAGE RACK COLUMN PROTECTOR

FIELD OF THE INVENTION

The present invention relates to a storage rack column protector for the foot of a rack column in warehouse racking systems in order to prevent or minimize damage to the column in the event of impact, for example by a fork lift.

BACKGROUND OF THE INVENTION

It is well known in the art to position such a protector around or at the foot of a support column in a storage racking system since the occurrence of accidental impact is not uncommon from the wheels disposed at the front of a fork lift. The usage of pallets facilitates the compact storage of goods in large volumes with relative ease of access, but the placement thereof on the racking demands reasonably accurate maneuvering of the fork lift: in the first instance to align the load with the selected rack, to elevate the same to the appropriate level and then to advance the fork lift to deliver and set down the load safely onto the rack at the correct distance from the front of the rack. It is also common to provide for the movement of the fork lift in the aisles formed between rows of racking and it is advantageous to define the limit of fork lift travel in order to avoid accidental damage by over travel by the fork lift.

Furthermore, some support columns include only one anchor fastener located there behind. In such a case, when a fork lift hits the column, the force could be significant enough to shear the anchor. When the hit occurs at an angle, the column may be subject to twisting about the anchor axis, thus damaging the column and most likely some other nearby sections of the storage rack.

The prior art contains a number of proposals for protecting rack columns from impact damage. For example U.S. Pat. No. 5,369,925 to Vargo discloses a sleeve arrangement extending part-circumferentially around the lower region of a column, the bottom end of the sleeve being embedded in an elastomeric flange, which in use is bolted to the concrete floor and surrounds said bottom end of the sleeve. An elastomeric cushion is provided around the top of the sleeve to interact with the column that is disposed within and embraced by the sleeve, the column standing freely on the floor. Any impact occasioned to the foot of the racking is taken by the sleeve which provides a dynamic buffer reaction from the elastomeric flange and the cushion. This column protector would be relatively expensive to produce in terms of bonding the elastomeric flange and the cushions to the sleeve. Furthermore, the amount of steel in the sleeve which is shaped, would be costly thereby compounding the overall price of the racking.

Another example of column protector is to be found in U.S. Pat. No. 6,672,017 to Larson who describes the provision of a collar and a foot bolted to the floor. Both the collar and the foot are ductile iron castings. The collar wraps around the base of the column in contact therewith to protect the column from impact, the castings not being damaged by such impact. A number of bolts are necessary to secure the foot to the floor and the very shape of the collar and the foot requires expensive casting.

The prior art outlined supra presents examples of column protector of some complexity and thus of high cost thereby adding to the overall cost of the racking system. Moreover, maintenance or replacement of the various elements comprising the column protectors would be of high cost and thus disadvantageous. Accordingly, there is a need for an improved dynamic storage rack column protector.

SUMMARY OF THE INVENTION

It is therefore a general object of the present invention to provide an improved storage rack column protector.

An advantage of the present invention is that the storage rack column protector is of simplified form and thus of less expense when compared to earlier proposals.

Another advantage of the present invention is that the storage rack column protector efficiently absorbs any impact without damaging the impacting object.

A further advantage of the present invention is that the storage rack column protector provides for an additional anchor fastener while protecting the same.

Yet another advantage of the present invention is that the storage rack column protector can be used as a dynamic stopper and/or guiding device, to ensure proper positioning of the fork lift relative to the rack, along the column; and similarly in between two adjacent columns of a same rack when used independently of the column.

Another advantage of the present invention is that the storage rack column protector allows space savings on the storage racks by forcing the wheels disposed at the front of a fork lift to align therewith, and voluntarily slightly bump there against.

A further advantage of the present invention is that the storage rack column protector provides for an additional anchor fastener while protecting the same.

A still further advantage of the present invention is that the column protector affords ease of maintenance or replacement should the need arise, thus conferring on the invention an advantage in comparison to the prior art concepts.

According to a first aspect of the present invention, there is provided a storage rack column protector comprising a base plate adapted for anchorage to a floor, flange at one end of the base plate, a region on the base plate for supporting a a column on the surface of the base plate to one side of the flange, a resilient member adapted for location on the other side of the flange and in contact therewith, and a buffer housing in use embracing said one side of the flange and holding the resilient member in contact with the other side of the flange as aforesaid, the buffer housing thereby providing a resilient member retainer in use retaining the resilient member in contact with the other side of the flange as aforesaid.

Typically, the resilient member retainer is a buffer housing in use embracing said one side of the flange and holding the resilient member in contact with the other side of the flange as aforesaid.

The base plate is conveniently provided with at least one bolt hole through which in practice an anchorage bolt would extend to be secured by a nut and washer thereby fixing the plate to the floor.

In one embodiment of the present invention the resilient member, typically a resilient block, is held within the buffer housing and in contact with the flange and is supported at floor level. The buffer housing presents an exterior impact surface, the resilient block being capable of movement upon external impact on the impact surface to absorb the shock.

In an alternative embodiment of the invention a further plate may be provided for disposition closely adjacent to the said other side of the flange, the plate being similarly affixed to the floor by an anchorage bolt. In this case, the resilient block may rest upon and be supported by the upper free end of the anchorage bolt, which may also function as a movement limiter for the resilient block. Typically, the further plate is secured to the base plate.

The buffer housing may advantageously be so formed as to present a spring fit to embrace both the resilient block and the flange, thus facilitating assembly and replacement should the need arise due to wear and tear.

The resilient block may be produced from rubber, but any other equivalent material may be employed.

According to a second aspect of the present invention there is provided in combination a rack column and a rack column protector according to the first aspect.

According to a third aspect of the present invention there is provided a stopper device comprising the storage rack column protector of the first aspect.

In this third aspect of the invention the stopper device is used on its own and does not function to protect a column but merely serves as a conventional buffer to resist the impact of either the front wheel of a fork lift or of one of the forks. The column protector thus presents a versatile and dual function means for use in a warehouse.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

Figure 1:
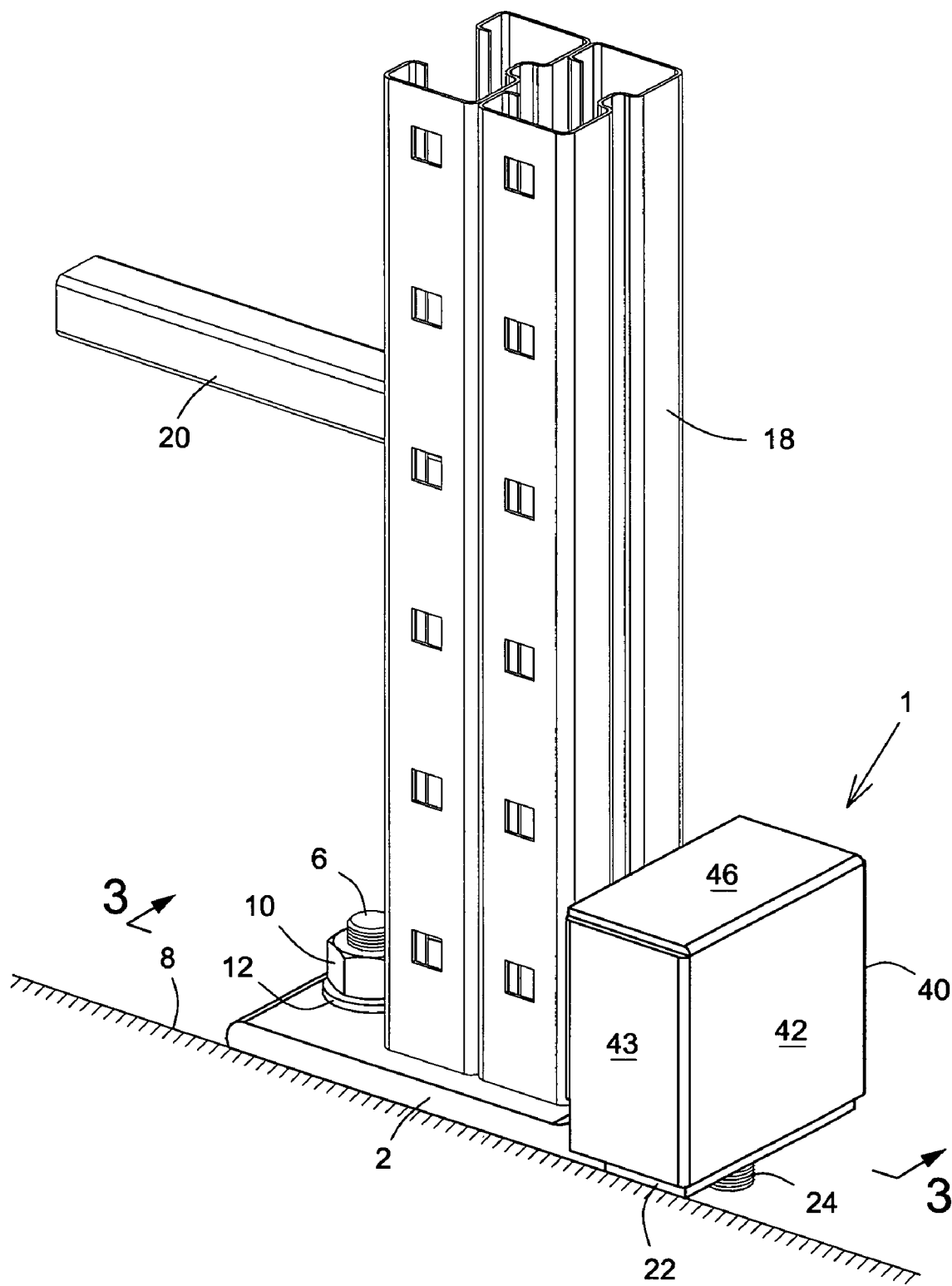
FIG. 1 is a schematic side elevation of a storage rack column protector in accordance with the present invention showing an external view in situ at the base of a column.

With reference to the annexed drawings the preferred embodiments of the present invention will be herein described for indicative purpose and by no means as of limitation.

A storage rack column protector is shown generally at 1 and comprises a base plate 2 provided with a through hole 4 for an anchorage bolt 6 extending into a floor 8 and being secured in use by a nut 10 and a washer 12. Upstanding at one end of the base plate 2 is a flange 14 and defined between the flange and the bolt hole is a column support region 16, a column being shown at 18 for illustrative purposes duly supported on said region 16. A rack cross beam is shown in part at 20.

On the other side of the flange 14 remote from the column support region 16 is another plate 22 shown secured to the floor 8 in similar fashion to the base plate 2 with an anchor bolt 24 with a nut 26 and a washer 28, the plate 22 being disposed closely adjacent to the flange 14 and typically secured thereto by welding or the like. Typically, the plate 22 is an extension of plate 2 and integral therewith while the flange would be secured thereto.

Figure 2:
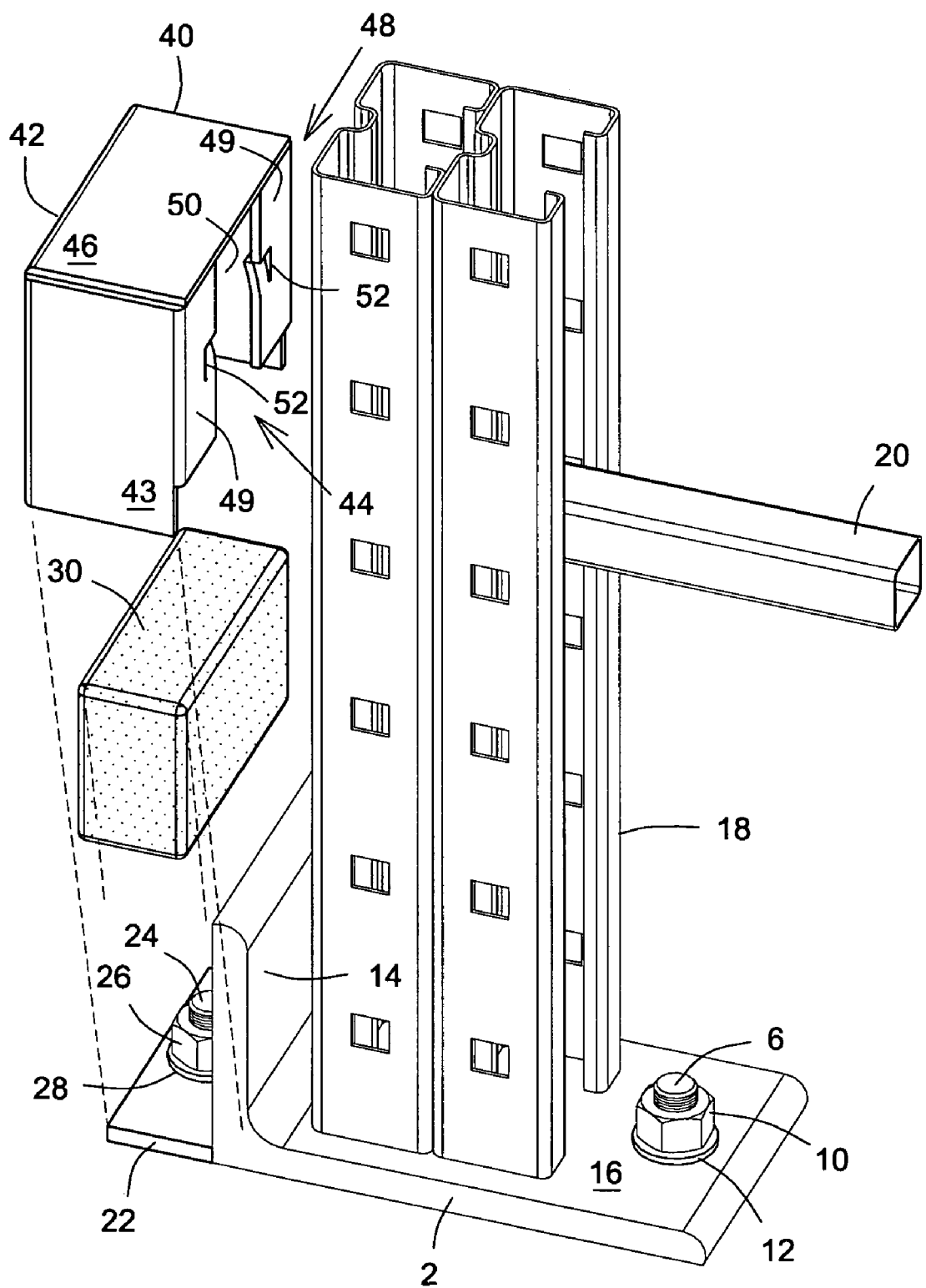
FIG. 2 is a schematic side elevation similar to that of FIG. 1 showing the other side of the column protector in an exploded view.
Figure 3:
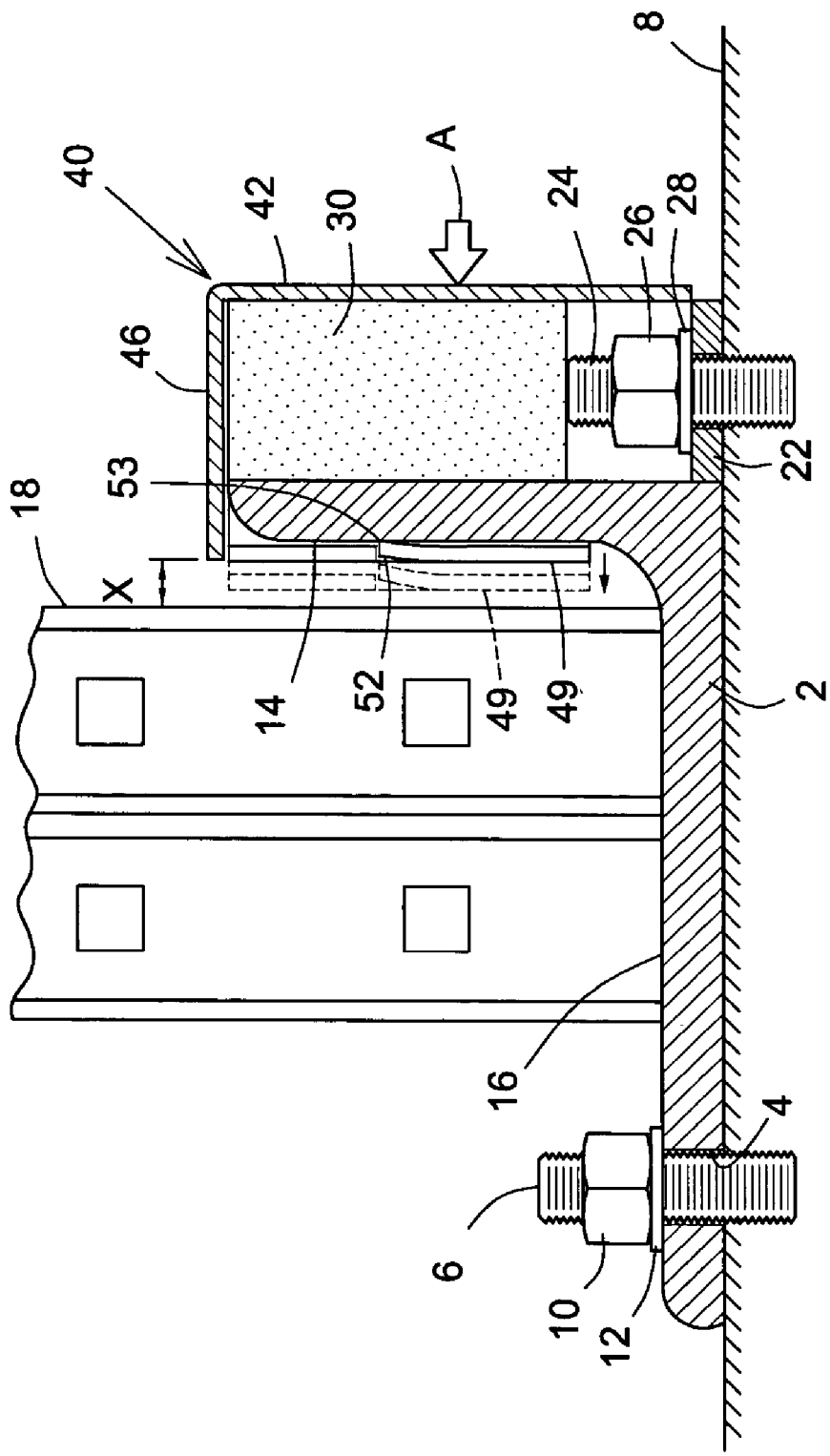
FIG. 3 is a cross section view taken on the line III-III in FIG. 1 showing the degree of movement of the resilient block and buffer housing under impact.

A resilient member such as a resilient block 30, in this embodiment made out of rubber-type material, of generally rectangular shape (although any other shape could be consider without departing from the scope of the present invention) is provided and is emplaced and supported on the top of the free end of the bolt 24 as shown more particularly in FIG. 3. Although not shown herein, it would be obvious to anyone skilled in the art that the resilient member could simply be one or more coil springs or made out of any other type of shock absorbing material without departing from the scope of the present invention. A resilient member retainer, typically in the form of a steel buffer housing 40 of essentially open box-like configuration is provided to encase the block 30 as illustrated in FIG. 3, and to essentially keep it against the flange 14. The front 42 of the housing 40 extends from the top of the block 30 and down to the top surface of the plate 22 and sides 43 extend downwardly when the housing is in the position as shown to the same level. The housing 40 has an opening 44 to fit over the block 30 and a closed end 46 to abut the top of the block 30. The closed end 46 is a flap of metal bent over as can be seen more particularly in FIGS. 1 and 2. The back 48 of the housing 40 extends from both sides part way across the width thereof, presenting a gap 50 through which the flange 14 can be seen (FIG. 3). The back 48 thus has in essence two leaves 49 each one of which is cut and crimped over as at 52 to provide an edge 53 which engages the surface of the flange 14 in sprung manner to provide a detent to prevent inadvertent removal of the housing 40 from the flange 14 and therefore the block 30.

Although not illustrated herein, the resilient member retainer could be a bolt extending through the flange and a shoulder through hole in the resilient member, in order to be protected from any direct impact, or extending through the flange and the resilient member and a shoulder through hole in an optional impact plate (not shown). In such a case, the resilient member is movably attached to the flange 14. Alternatively, the resilient member retainer could also be, without departing from the scope of the present invention, any type of adhesive, glue or the like to bond the resilient member onto the flange 14.

Figure 5:
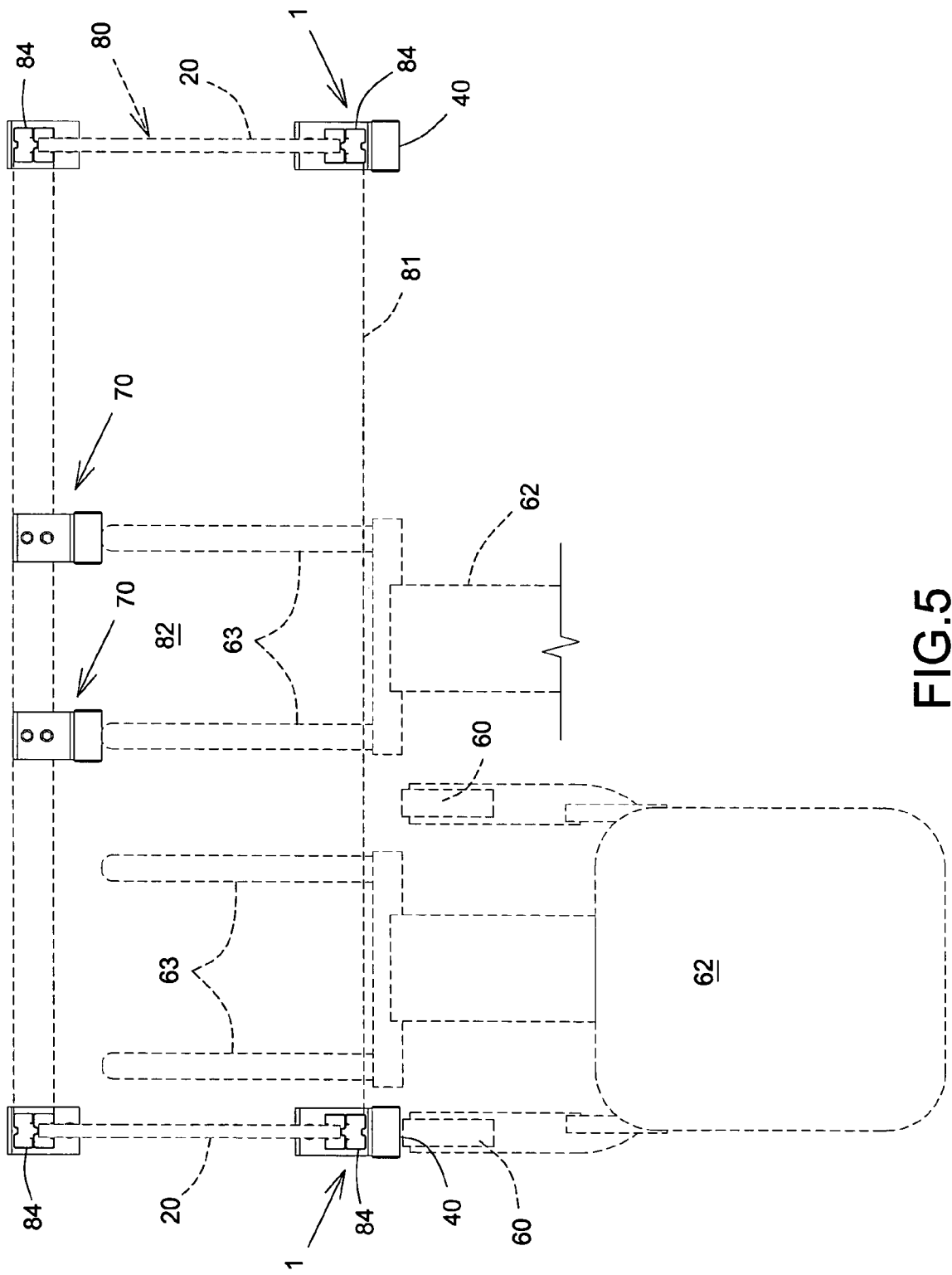
FIG. 5 is a cross section view in plan view of a fork lift in association with a storage rack system incorporating the column protector of the present invention.

In situ at the base of the column 18 which is freely mounted on the base plate 2 or guided thereon via a protrusion (not shown), the dynamic protector 1 provides a buffer against contact from the front wheel 60 of a fork lift 62 as illustrated in FIG. 5. The illustration indicates contact between one such front wheel 60 and the front 42 of the buffer housing 40 and FIG. 3 shows by arrow A the direction of impact of the wheel 60 with the front 42. Such contact results in the housing 40 moving against the bias of the block 30 to the position partially shown in dotted outline in said figure, namely away from the flange 14. There is a sufficient gap 'X' initially between the housing 40 and the column 18 to ensure that the column is isolated from the impact and is thus protected against any damage that would otherwise be incurred in the absence of the present invention.

Figure 4:
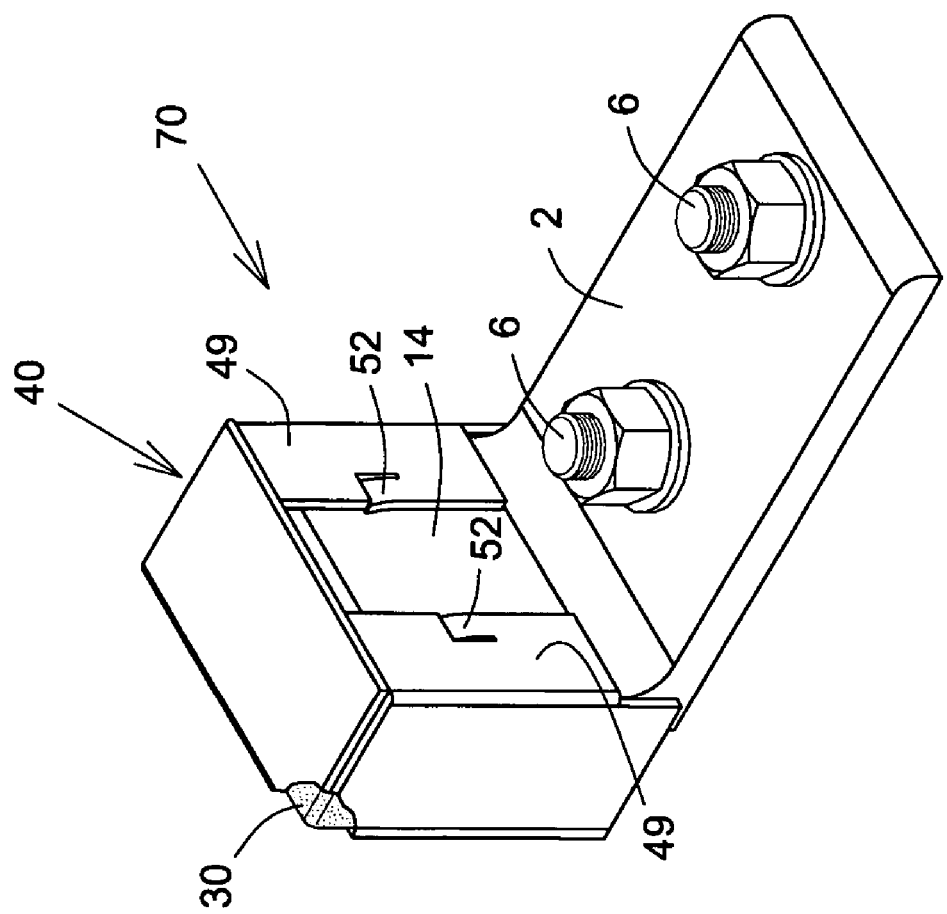
FIG. 4 is a partially broken perspective view of a stopper device employing the storage rack column protector of the present invention.

Referring now to FIG. 4 there is shown the column protector 1 of the present invention substantially the same as that of FIG. 1 save that the plate 22 is omitted. In this instance the protector 1 is employed merely as a dynamic stopper device 70 which may advantageously be used at ground level as a buffer for the forks 63 of the fork lift 62 to prevent the latter from overshooting the length of an aisle of the racking system 80 or the space 82 between the support columns 84, as shown in FIG. 5. The dynamic stopper device 70 functions in exactly the same way as the protector by providing a resilient buffer which the fork can contact, voluntarily by the operator, without occasioning damage such that the fork lift 62 is guided to remain at a proper position relative to the shelf(s) 81 of the racking system 80.

The present invention thus represents a departure from the prior art in terms of affording simplicity and efficacy in the protection of a column or indeed of any other moving element operating at floor level within the warehouse.

Furthermore, its simple configuration and shape of the interengaging elements provide for inexpensive protection with ease of replacement and maintenance if and when necessary.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinabove described.

I claim:

1. A storage rack column protector comprising:
   a base plate adapted for anchorage to a floor, a flange at one end of the base plate, a region on the base plate for supporting a column on the surface of the base plate to one side of the flange;
   a resilient member adapted for location on the other side of the flange and in contact therewith; and
   a buffer housing in use embracing said one side of the flange and holding the resilient member in contact with the other side of the flange as aforesaid, the buffer housing thereby providing a resilient member retainer in use retaining the resilient member in contact with the other side of the flange as aforesaid.

2. A storage rack column protector according to claim 1 wherein the resilient member is held within the buffer housing and in contact with the flange and is supported at floor level.

3. A storage rack column protector according to claim 1 wherein the buffer housing presents an exterior impact surface, the resilient member being adapted for movement in use upon external impact on the impact surface thereby to absorb shock.

4. A storage rack column protector according to claim 1 wherein a further plate is provided and disposed closely adjacent the side of the flange remote from said one side.

5. A storage rack column protector according to claim 4 wherein a fixture is provided to secure the plate to the floor and the fixture in use supports the resilient member within the buffer housing.

6. A storage rack column protector according to claim 5 wherein the fixture is a bolt and nut assembly.

7. A storage rack column protector according to claim 6 wherein the bolt and nut assembly are adapted in use to function as a movement limiter for the buffer housing and the resilient member, 8. A storage rack column protector according to claim 4 wherein the further plate is secured to the base plate.

9. A storage rack column protector according to claim 1 wherein the buffer housing is so formed as to present a spring fit to embrace the resilient member and the flange.

10. A storage rack column protector according to claim 1 wherein the base plate is provided with at feast one bolt hole through which in use an anchorage boll extends to be secured by a nut and washer assembly to fix the plate to the floor.

11. A storage rack column protector according to claim 1 wherein the resilient member is a resilient block produced from rubber.

12. A storage rack column protector according to claim 1 in combination with a column.

13. A stopper device comprising a storage rack column protector according to claim 1.

* * * * *